United States Patent [19]

Stearns

[11] 3,923,149
[45] Dec. 2, 1975

[54] MATERIAL HANDLING APPARATUS FOR HOGGED FUEL

[75] Inventor: George H. Stearns, Kalispell, Mont.

[73] Assignee: Mill Supply, Inc., Missoula, Mont.

[22] Filed: June 8, 1973

[21] Appl. No.: 368,362

[52] U.S. Cl. ................. 198/106; 198/218; 222/409
[51] Int. Cl.² ......................................... B65G 25/04
[58] Field of Search ........... 198/218, 219, 106, 107; 222/409, 334

[56] References Cited
UNITED STATES PATENTS

| | | | |
|---|---|---|---|
| 1,719,221 | 7/1929 | Gibney | 198/218 X |
| 2,432,852 | 12/1947 | Arridson | 198/218 X |
| 2,592,010 | 4/1952 | Cole et al. | 198/218 X |
| 3,355,008 | 11/1967 | Millazzo | 198/219 |
| 3,412,859 | 11/1968 | Thornton | 198/219 X |
| 3,525,446 | 8/1970 | Grafstrom | 222/409 X |

FOREIGN PATENTS OR APPLICATIONS

| 1,180,342 | 6/1959 | France | 198/219 |
|---|---|---|---|

*Primary Examiner*—Drayton E. Hoffman
*Assistant Examiner*—Hadd S. Lane
*Attorney, Agent, or Firm*—LeBlanc & Shur

[57] ABSTRACT

The conveyor includes a plurlity of conveyor sections each comprised of a pair of pushbars mounted for reciprocating movement along a conveyor surface. Crossbars having inclined rear surfaces and vertical front surfaces are secured to the pushbars at longitudinally spaced positions for reciprocating movement therwith. Checker bars having inclinded rear surfaces and upstanding front surfaces are fixed to the conveyor surface between each pair of crossbars. The sections are reciprocated in an out-of-phase relation one with the other to continuously deliver regulated quantities of hogged fuel to a transversely moving conveyor at the forward delivery end of the conveyor sections. Upon advancement of each section, the fuel is advanced by the upstanding faces of the crossbars and passes over the inclined surfaces of the checker bars. Upon retraction of each section, the inclined faces of the crossbars slide under the advanced fuel whereby the fuel is maintained in its advanced position ready for further movement.

9 Claims, 6 Drawing Figures

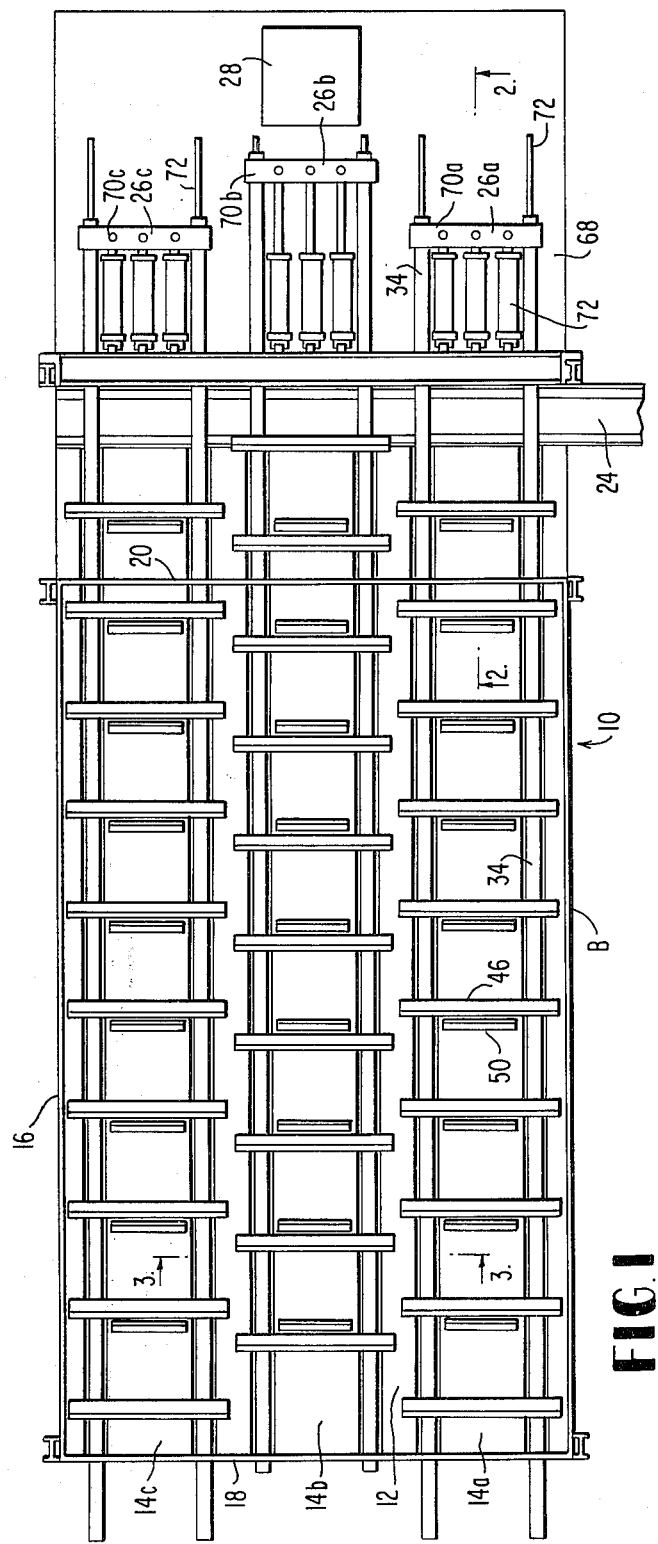
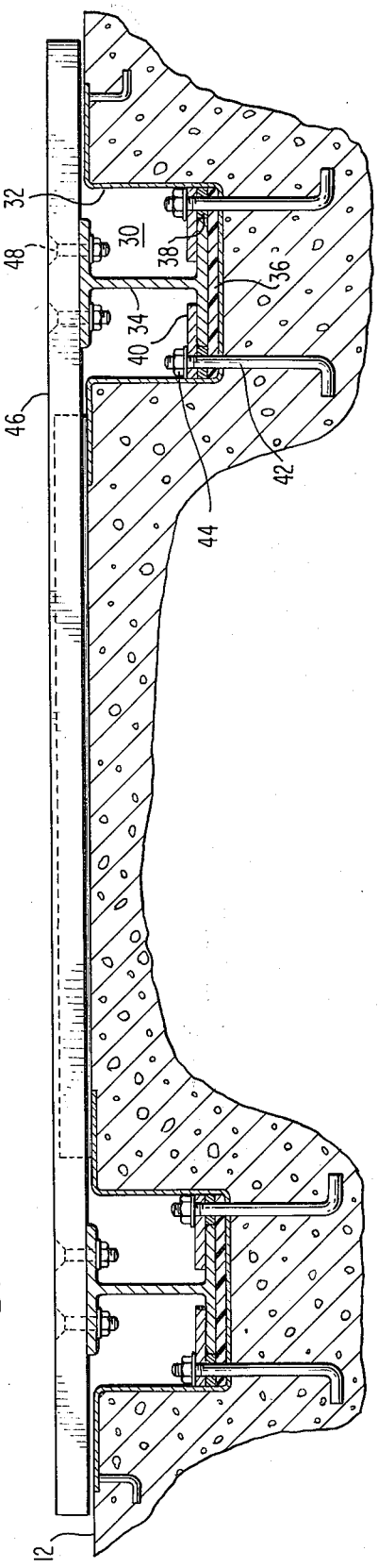
FIG. 1
FIG. 3

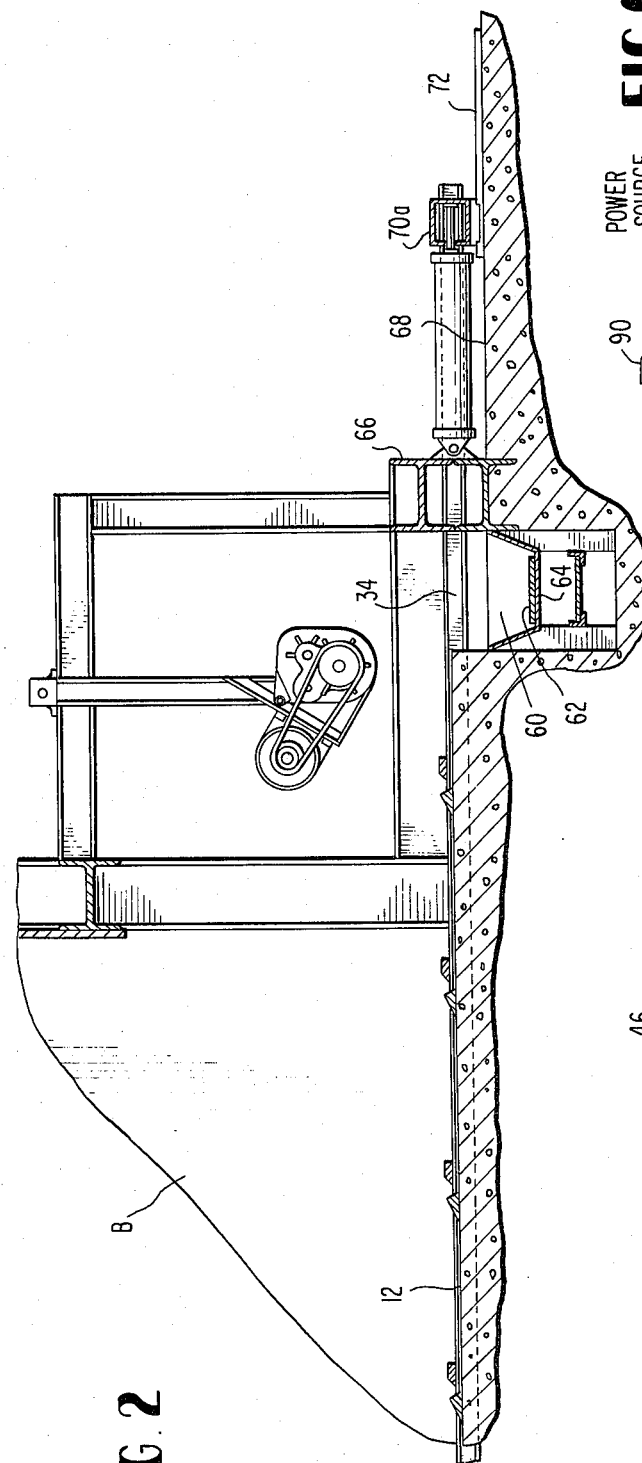
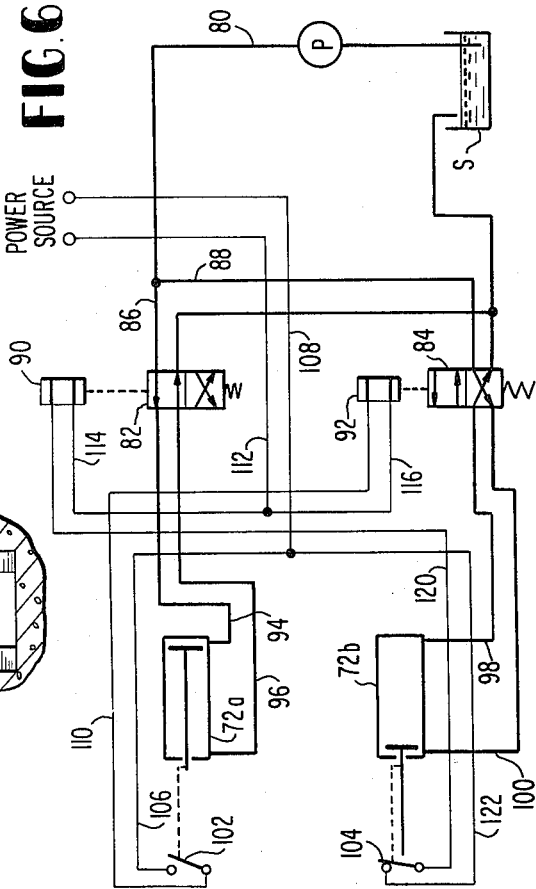
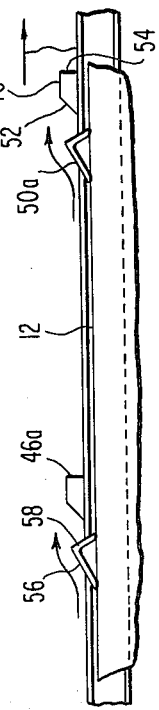
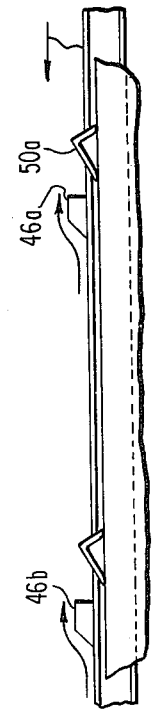

MATERIAL HANDLING APPARATUS FOR HOGGED FUEL

The present invention relates to material handling apparatus and particularly to a conveyor system for providing a continuous regulated flow of hogged fuel to a discharge station.

For many years, sawmill and plywood operators have developed, tested and put into practice a variety of apparatus for discharging material such as sawdust, wood shavings and chips, shredded bark, etc., commonly referred to as "hogged fuel", from storage bins. For example, drag chains and screw conveyors have been provided in the bottom of the bins in efforts to transport the material out of the bins to a discharge station. While these various apparatus and methods were partially successful, many problems occured such as bridging of the material over the chains, freezing of the material particularly in colder climates whereby the chains and screw conveyors were unable to move the material from the bin, etc. One particular problem encountered and which problem is particularly acute when the discharge apparatus is supplying fuel for a burner is the failure of such apparatus to provide a steady regulated amount of fuel for delivery to the burner. At times, an excessive amount of fuel would be discharged from the bin onto a conveyor for delivery to the burner while at other times, because of freezing or other reasons, little or no fuel would be discharged into the conveyor. Consequently, none of these systems guaranteed a regulated and constant flow of fuel at the prescribed flow rate.

Various material handling apparatus are disclosed in the patent literature. For example, U.S. Pat. Nos. 3,010,218; 2,743,006 and 2,743,007 disclose various forms of conveyors for transport of various types of material. However, these conveyors do not guarantee a regulated flow rate. Particularly, such conveyors do not provide an out-of-phase relation between the conveyor sections whereby a steady and constant flow rate is achieved. Moreover, these conveyors are characterized by mechanical complexity and appear to have similar problems as the conveyors described previously with respect to the problem at hand.

The present invention provides material handling apparatus including a conveyor for transport of hogged fuel which minimizes and/or eliminates the above noted and various other problems associated with prior material handling apparatus for like purpose and provides a novel and improved material handling conveyor having various advantages in construction, mode of operation and use in comparison with such prior apparatus. Particularly, the present invention provides a conveyor construction comprised of a plurality of conveyor sections disposed within a storage bin, for example containing hogged fuel. Each such conveyor section includes a pair of elongated pushbars carried along for longitudinal reciprocating movement on a conveying surface comprising the bottom of the bin. A plurality of crossbars are carried by the pushbars at longitudinally spaced positions therealong. Each crossbar has an inclined rear surface and a substantially vertically upstanding front surface. Fixed on the conveyor surface are a plurality of checker bars arranged such that a checker bar is disposed between each pair of crossbars carried by the pushbars. Each checker bar has an upwardly inclined rear surface and an upstanding forward surface. It will be appreciated that forward movement of each conveyor section results in movement of the material or hogged fuel in front of each of the crossbars a distance corresponding to the distance of movement of the conveyor section. Upon retraction of each conveyor section, the inclined rear surface of the crossbars enables the crossbars to slide under the advanced material whereby the latter is maintained in an advanced position. This reciprocating action is repeated whereby the material is advanced step by step toward a discharge conveyor at the forward end of the conveyor sections. This discharge conveyor lies in a trough for receiving the material advanced by the conveyor sections out of the bin and transports the material in a direction generally transverse to the direction of movement of the material from the bin. Thus, the material advanced by the conveyor sections is transported onto the discharge conveyor which in turn conveys the material to the discharge station, either a burner, a truck-loading station or the like.

It is a particular feature of the present invention that adjacent conveyor sections are operated in an out-of-phase relation. Particularly, adjacent conveyor sections are reciprocated such that when one section is advanced, the other section is retracted. This not only serves to agitate the material in the bin due to the out-of-phase motions, particularly where the material interfaces with both conveyor sections but also serves to maintain a continuous and regulated flow of fuel towards the discharge station.

Furthermore, the construction of the conveyor sections is such that the conveyor is long-lasting, durable and substantially free from down-time. The simplicity and the ruggedness of the present construction enables the conveyor to operate efficiently notwithstanding the wide variety of materials to be conveyed and the extremes of climatic conditions encountered during operations.

Accordingly, it is a primary object of the present invention to provide a novel and improved material handling apparatus.

It is another object of the present invention to provide a novel and improved material handling apparatus for transport of hogged fuel.

It is still another object of the present invention to provide a novel and improved material handling apparatus including a conveyor constructed to provide a regulated and prescribed flow rate of material.

It is a further object of the present invention to provide a novel and improved material handling apparatus including a plurality of conveyor sections operable in an out-of-phase relation to provide a regulated flow of material.

It is a related object of the present invention to provide a novel and improved material handling apparatus for transport of hogged fuel from storage bins.

It is a still further object of the present invention to provide a novel and improved conveyor which is simple and economical to construct, formed of durable and long-lasting materials, rugged, dependable and simple in operation.

These and further objects and advantages of the present invention will become more apparent upon reference to the following specification, appended claims and drawings wherein:

FIG. 1 is a plan view of a conveyor constructed in accordance with the present invention;

FIG. 2 is an enlarged fragmentary cross-sectional view thereof taken generally about on lines 2—2 in

FIG. 1;

FIG. 3 is an enlarged fragmentary cross-sectional view thereof taken generally about on lines 3—3 in FIG. 1;

FIGS. 4 and 5 are fragmentary side elevational views of a conveyor section illustrating the manner in which the reciprocating movement of each section advances material along the conveyor surface; and FIG. 6 is a schematic view of an electric-hydraulic circuit for use in operating the conveyor of the present invention.

Referring now to the drawings, particularly to FIG. 1, there is illustrated a material handling apparatus generally designated 10 constructed in accordance with the present invention and comprised of a conveyor surface 12 and a plurality of conveyor sections 14a, 14b, and 14c. These conveyor sections are disposed in a bin B having upstanding side and end walls 16 and 18, respectively with the front end of the bin being closed by a wall 20 spaced above the conveyor sections to permit outflow of material from the bin. The conveyor surface 12 as well as the conveyor sections 14a, 14b and 14c are located along the bottom of the bin. It will be appreciated that at least a pair of conveyor sections are located in the bin and that an additional one or more conveyor sections may be provided as needed dependent upon the particular size of the bin.

At the forward or discharge end of conveyor sections 14a, 14b, and 14c, there is provided a transversely extending discharge conveyor 24 for receiving the material advanced by the conveyor sections, i.e., from left to right as illustrated in FIG. 1, and transporting such material in a direction generally normal to the direction of advance of the material from the bins for discharge at a discharge station, not shown. The discharge station may comprise a burner or a truck-loading station or the like, as desired. On the side of the discharge conveyor 24 remote from conveyor sections 14a, 14b, and 14c, there are provided yoke assemblies 26a, 26b and 26c, hydraulically actuated cylinders therefor and a control unit 28 whereby the conveyor sections are reciprocated in an out-of-phase relation one to the other in a manner described more particularly hereinafter.

Referring now particularly to FIG. 3, the conveyor surface 12 is preferably the upper surface of a concrete bed in which there is provided a pair of longitudinally extending, parallel recesses 30 for each conveyor section. Elongated generally channel-shaped guideways 32 are secured within the recesses. The guideways 32 are secured to the concrete in any well known conventional manner. Each conveyor section is provided with a pair of longitudinally extending pushbars 34 which preferably consist of elongated I beams. The pushbars 34 are disposed in recesses 30 and are mounted for reciprocating sliding movement therein. Particularly, a longitudinally extending wear strip 36, preferably formed of ultra high density polyethylene, is provided along the bottom of each recess 30 on top of the guideway 32. Bearing strips 38 are provided on top of wear strip 36 and along opposite sides of each guideway 32. A pair of elongated hold-down plates 40 are disposed on top of the strips 38 and extend inwardly toward the center of recess 30 to overlie the lower flanges of the I beam 34 which rests on the wear strip 36. Rods 42 are embedded in the concrete bed and upstand through the guideway 32 at longitudinally spaced positions therealong and through the strips 38 and 40 terminating in threaded upper ends. Bolts 44 secure the strips 40 in overlying relation to the flanges of the I beam whereby the pushbars 34 are mounted for reciprocating longitudinal movement on wear strips 36 and are prevented from lateral movement by the strips 38.

The pushbars 34 carry a plurality of crossbars 46 at uniform, longitudinally spaced, positions therealong. Particularly, the crossbars 46 extend transversely between the pair of pushbars 34 for each conveyor section and are secured thereto by bolts 48 received in the upper flanges of the pushbars 34. The crossbars 46 are spaced slightly above conveyor surface 12 whereby they are free for reciprocating movement with pushbars 34. A plurality of checker bars 50 are secured at longitudinally spaced positions along conveyor surface 12 and between the longitudinally extending recesses 30 of each conveyor section. The checker bars 50 are located such that a checker bar extends between each pair of crossbars 46, the checker bars being uniformly longitudinally spaced one from the other, respectively.

As best illustrated in FIGS. 4 and 5, the crossbars 46 each have an upwardly inclined rear surface 52 and a vertical front surface 54. The checker bars 50 have an upwardly inclined rear surface 56 and an upstanding, slightly rearwardly inclined, forward surface 58. From the ensuing description it will be appreciated that the conveyor sections are reciprocated a longitudinal distance less than the distance between the checker bars 50.

From a review of FIGS. 4 and 5, it will be seen that material disposed on conveyor surface 12 is advanced by engagement of the front surfaces 54 of the crossbars 46 with such material. As illustrated, crossbar 46a advances from the position illustrated in FIG. 4 to the position illustrated in FIG. 5 with the material in front of the crossbar being pushed along ahead of the crossbar. As the material is advanced, it moves the upwardly inclined rear surface 56 of the fixed checker bar 50a. Upon retraction of the conveyor sections, the advanced is maintained or held in its advanced position and against rearward movement by the front face 58 of the checker bar 50a while the crossbar 46a slides underneath the material similarly advanced by the preceding crossbar 46b. That is, the advanced material slides over the inclined surface 52 of the crossbar 46a when the latter is retracted. In this manner, it will be appreciated that reciprocating movement of the crossbars advances material in the bin discrete distances for each complete cycle of movement toward the discharge end of the conveyor sections.

The discharge conveyor 24 is disposed in a trough 60 formed in the conveyor surface 12. Trough 60 is disposed at an elevation lower than the elevation of conveyor surface 12 and below conveyor sections 14a, 14b and 14c. The discharge conveyor may be comprised of various forms of conveyor, for example drag chains, or a vibrating conveyor, and in the preferred embodiment hereof, comprises a continuous conveyor having an endless conveyor belt 62 moving along a support surface 64 within trough 60. Suitable means, not shown, are provided for moving conveyor belt 60 whereby material removed from bin B by the conveyor sections and dumped into trough 60 is conveyed by belt 62 to a discharge station.

At the forward end of the bin and on the side of conveyor 24 remote from conveyor sections 14a, 14b and 14c, there is provided a transversely extending support 66 fixed to the conveyor bed, the bed having a surface 68 disposed at an elevation slightly lower than conveyor surface 12. The ends of pushbars 34 extend through support 66. The pairs of bars for each conveyor section are connected one to the other by a cross member or yoke 70a, 70b, and 70c, respectively. A track 72 underlies each of the pushbars 34, the track being supported on surface 68. Each yoke is provided with a pair of guideways for sliding along a pair of tracks 72 as the conveyor sections are reciprocated whereby the pushbars and hence the yokes of each conveyor section are maintained in proper alignment for accurate longitudinal movement thereof. A plurality of hydraulically actuated cylinders 72, in this instance three, are disposed between the fixed support 66 and each yoke assembly 70a, 70b, and 70c. The cylinders 72 are pivoted at one end to support 66 with the ends of the piston rods being secured to the yoke assemblies. Thus, actuation of the cylinders to extend the piston rods displaces the yoke assemblies and the pushbars 34 carried thereby in a direction to advance the material in the bin toward the discharge conveyor 24 in a manner previously set forth. Conversely, retraction of the piston rods moves the pushbars 34 in a rearward direction whereby the crossbars slide under the advanced material.

Referring to FIG. 6, there is illustrated an electrohydraulic circuit for displacing the conveyor sections in an out-of-phase relation one with the other. In FIG. 6, the cylinders for one conveyor section are schematically illustrated by the representation of a single cylinder 72a. The cylinders for another conveyor section are likewise illustrated by the single cylinder 72b. It will be appreciated that in the preferred embodiment, three cylinders are utilized for each conveyor section and that such cylinders would be connected in parallel to the associated valve in the circuit. The cylinders for the third and other sections as desirable are not herein illustrated in order to avoid repetition. Particularly, hydraulic fluid from a source S is pumped by a variable piston pump P via main hydraulic line 80 to a pair of valves 82 and 84 via parallel conduits 86 and 88, respectively. Valves 82 and 84 are four-way two-position spring-return valves actuated by solenoids 90 and 92, respectively. Opposite ends of cylinder 72a are connected to valve 82 via conduits 94 and 96. Opposite ends of cylinder 72b are connected to the other valve 84 via conduits 98 and 100.

With respect to the electrical aspect of the circuit, switches 102 and 104 are located such that they close at the end of the piston stroke, i.e., at full extension of the piston and remain closed until full retraction of the piston in a manner set forth hereinafter. One contact of switch 102 is coupled to a power source via lines 106 and 108. The other contact of switch 102 is connected to solenoid 90 via line 110. Line 112 from the power source is connected to solenoids 90 and 92 via line 114 and 116, respectively. Solenoid 90 is also connected to one contact of switch 104 via line 120 while the other contact of switch 104 is connected with line 108 via line 122. Switches 102 and 104 are coupled to the piston rods of the respective cylinders 72a and 72b through lost motion linkages indicated by the dashed lines coupling the piston rods and the switch arms. In this manner, the switches are closed when the piston rods are fully extended and remain closed until the piston rods are fully retracted. Upon full retraction, the pistons reach the end of the lost motion in the linkages and, through the linkages, open the switches. The switches remain open upon extension of the piston rods until the piston rods are fully extended whereupon the switches close and the aforedescribed cycle repeats itself.

Suitable variable flow control devices are installed in the hydraulic lines such that the rate of flow of the hydraulic fluid to the cylinders can be controlled. In this manner, the speed at which the pushbars will be advanced and retracted can be controlled. Also, suitable start switches, not shown, are provided in the electrical circuit. With the circuit in the configuration illustrated, hydraulic fluid is provided cylinder 72a to extend its piston via lines 86 and 94. Simultaneously, hydraulic fluid is provided the opposite end of cylinder 72b via line 80, 88 and 100 to retract its piston rod. Thus, extension of the piston rod associated with cylinder 72a displaces the yoke connected thereto along tracks 72 thereby advancing the pushbars 34 connected to such yoke, i.e., advances conveyor section 14a. Retraction of the piston rod associated with cylinder 72b retracts the yoke secured thereto along tracks 72 and displaces the pushbars associated with such yoke in a rearward direction, i.e., retracts conveyor section 14b. Accordingly, one conveyor section is advanced while the adjacent conveyor section is retracted. At full extension of the piston rod associated with cylinder 72a, switch 102 is closed thereby energizing solenoid 92 via lines 108, 106, 110, 116 and 112 to shift valve 84 against the bias of its spring. Simultaneously, full retraction of the piston associated with cylinder 72b opens switch 104 thereby de-energizing solenoid 90 and enabling valve 82 to be spring-returned. Shifting of valves 82 and 84 causes hydraulic fluid to be supplied to the opposite ends of the cylinders 72a and 72b whereby the piston rod associated with cylinder 72a retracts and the piston rod associated with cylinder 72b extends. Retraction of the piston rod of cylinder 72a displaces the corresponding yoke assembly and pushbars along track 72 to move the conveyor section, i.e., section 14a, rearwardly. Advancement of the piston associated with cylinder 72b moves the corresponding yoke assembly and pushbars to advance the adjacent conveyor section, i.e., section 14b. Upon full retraction of the piston rod associated with cylinder 72a, switch 102 opens to de-energize solenoid 92 enabling valve 84 to be spring-returned to the position illustrated in FIG. 6. Simultaneously, full extension of the piston rod associated with cylinder 72b closes switch 104 thereby energizing solenoid 90 to shift valve 82 to the position illustrated in FIG. 6 whereupon the cycle is repeated. It will be appreciated that this cycle is repeated continuously until power is cut off from the circuit. With such repeated cycling in the foregoing manner, the adjacent conveyor sections are reciprocated in an out-of-phase relation one with the other.

It will be appreciated that the foregoing described material handling apparatus fully accomplishes the objects of the present invention in that there is provided a conveyor wherein hogged fuel disposed within a bin is removed or discharged from the bin onto a discharge conveyor in a manner providing fully regulated and selected quantities of fuel. The out-of-phase reciprocating relation between adjacent conveyor sections provides a continuous supply or discharge of the material from the bin onto the cross conveyor 24. Further, the foregoing is provided in a rugged, dependable and economical construction.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A material handling apparatus for advancing material comprising a base including a conveyor surface, a plurality of conveyor sections mounted on said surface, each said section including an elongated pushbar mounted for longitudinal reciprocating movement along said surface, a plurality of crossbars carried by said pushbar at longitudinally spaced positions therealong for movement therewith, a plurality of longitudinally spaced checker bars fixed to said surface with each checker bar located between a longitudinally adjacent pair of crossbars, each of said checker and crossbars having an upwardly and forwardly inclined rear surface and a forward surface for butting material to be conveyed, means for advancing said sections in a forward direction whereby the crossbars advance the material forwardly thereof along said surface and over the inclined surfaces of said checker bars and for retracting said sections whereby the crossbars move under the advanced material with such material being retained against substantial rearward movement by the forward surfaces of said checker bars, a conveyor located along the discharge end of said conveyor sections at an elevation below said conveyor surface for receiving material therefrom and discharging such material to one side of said apparatus, said advancing and retracting means being located on the side of said conveyor remote from said crossbars and bridging over said conveyor, each said conveyor section including a pair of laterally spaced elongated pushbars, said crossbars extending between and being secured to said pushbars, said advancing and retracting means including a yoke assembly for each said conveyor section including a cross member secured to said pushbars, a fixed support carried by said base, and fluid actuated means engaging betwen fixed support and said cross member for reciprocating said conveyor section, a pair of tracks carried by said base for each conveyor section, and means engaging between said yoke assemblies and said pairs of tracks for guiding said pushbars for accurate longitudinal movement, said base including for each section a pair of elongated recesses, a pair of wear strips disposed in said recesses with said pushbars respectively bearing on said wear strips, the forward ends of said pushbars bridging over said conveyor and extending through said fixed support.

2. A material handling apparatus for advancing material comprising a base including a conveyor surface having a plurality of laterally spaced longitudinally extending guideways recessed below said conveyor surface, a plurality of conveyor sections mounted on said surface, each said section including an elongated pushbar at least partially disposed within a recessed guideway and carried thereby for longitudinal reciprocating movement relative to said conveyor surface, a plurality of crossbars secured to said pushbar at longitudinally spaced positions therealong for movement therewith and above said conveyor surface, a plurality of longitudinally spaced checker bars fixed to said surface with each checker bar located between a longitudinally adjacent pair of crossbars, each of said checker crossbars having an upwardly and forwardly inclined rear surface and a forward surface for butting material to be conveyed, means for advancing said sections in a forward direction whereby the crossbars advance the material forwardly thereof along said surface and over the inclined surfaces of said checker bars and for retracting said sections whereby the crossbars move under the advanced material with such material being retained against substantial rearward movement by the forward surfaces of said checker bars, a fixed support carried by said base, fluid actuated means engaging between said fixed support and said conveyor section for reciprocating the same, a conveyor located along the discharge end of said conveyor sections at an elevation below said conveyor surface for receiving material therefrom and discharging such material to one side of said apparatus, said advancing and retracting means being located on the side of said conveyor remote from said crossbars and bridging over said conveyor.

3. Apparatus according to claim 2 wherein each said conveyor section includes a pair of laterally spaced elongated pushbars at least partially disposed within said guideways, said crossbars extending between and being secured to said pushbars, said advancing and retracting means including a yoke assembly for each said conveyor section including a cross member secured to said pushbars, at least a part of said fluid actuated means engaging between said fixed support and said cross member for reciprocating said conveyor section.

4. Apparatus according to claim 3 including a pair of tracks carried by said base for each conveyor section, and means engaging between said yoke assemblies and said pairs of tracks for guiding said pushbars for accurate longitudinal movement.

5. Apparatus according to claim 4 including a pair of wear strips disposed in said guideways with said pushbars respectively bearing on said wear strips, the forward ends of said pushbars bridging over said conveyor and extending through said fixed support.

6. A material handling apparatus for advancing material comprising a base including a conveyor surface having a plurality of laterally spaced longitudinally extending guide ways recessed below said conveyor surface, a plurality of conveyor sections mounted on said surface, each of said sections including a pair of laterally spaced elongated pushbars at least partially disposed within a pair of said recessed guide ways and carried therein for longitudinal reciprocating movement relative to said conveyor surface, a plurality of crossbars extending between and secured to each pair of said pushbars at longitudinally spaced positions therealong for movement therewith and above said conveyor surface, a plurality of longitudinally spaced checker bars fixed to said surface with each checker bar located between a longitudinally adjacent pair of crossbars, each of said checker bars and crossbars having an outwardly and forwardly inclined rear surface and a forward surface for butting material to be conveyed, means for advancing said sections in a forward direction whereby the crossbars advance the material forwardly thereof along said surface and over the inclined surface of said checker bars and for retracting said sections whereby the crossbars move under the advanced material with such material being retained against substantial rearward movement by the forward surfaces of said checker bars, said advancing and retracting means including a yoke assembly for each said conveyor section including a cross member secured to said pushbars, a fixed support carried by said base, and fluid actuated means engaging between said fixed support and each said cross member for reciprocating said conveyor sections, said advancing and retracting means further including means for reciprocating said sections in an out-of-phase relation one with the other with one of said sections being moved forwardly to advance the material while the other section is moved rearwardly, including a conveyor located along the discharge end of said conveyor sections at an elevation below said conveyor surface for receiving material therefrom and discharging such material to one side thereof, said pushbars passing over said conveyor with said yoke assemblies being located on the side of said conveyor remote from the crossbars.

7. A material handling apparatus for advancing material comprising a base including a conveyor surface having a plurality of laterally spaced longitudinally extending guide ways recessed below said conveyor surface, a wear strip disposed in each said guide way, a plurality of conveyor sections mounted on said surface, each of said sections including a pair of laterally spaced elongated pushbars at least partially disposed within a pair of said recessed guide ways and bearing on the wear strips in said guide ways for longitudinal reciprocating movement relative thereto, means for retaining said pushbars in said guide ways including hold-down clamps in said guide ways for retaining said pushbars bearing on said wear strips, a plurality of crossbars extending between and secured to each pair of pushbars at longitudinally spaced positions therealong for movement therewith and above said conveyor surface, a plurality of longitudinally spaced checker bars fixed to said surface with each checker bar located between a longitudinally adjacent pair of crossbars, each of said checker bars and crossbars having an upwardly and forwardly inclined rear surface and a forward surface for butting material to be conveyed, means for advancing said sections in a forward direction whereby the crossbars advance the material forwardly thereof along said surface and over the inclined surfaces of said checker bars and for retracting said sections whereby the crossbars move under the advanced material with such material being retained against substantial rearward movement by the forward surfaces of said checker bars, said advancing and retracting means comprising a yoke assembly for each conveyor section including a cross member secured to the pushbars of each conveyor section, a fixed support carried by said base, fluid actuated means engaging between said fixed support and said cross members for reciprocating said conveyor section, and means for reciprocating said sections in an outofphase relation one with the other with one of said sections being moved forwardly to advance the material while another section is moved rearwardly.

8. Apparatus according to claim 7 including a pair of tracks carried by said base for each conveyor section, and means engaging between said yoke assemblies and said pairs of tracks for guiding said pushbars for accurate longitudinal movement.

9. A material handling apparatus for advancing material comprising a base including a conveyor surface having a plurality of laterally spaced longitudinally extending guide ways recessed below said conveyor surface, a plurality of conveyor sections mounted on said surface, each of said sections including a pair of laterally spaced elongated pushbars at least partially disposed within a pair of said recessed guide ways and carried therein for longitudinal reciprocating movement relative to said conveyor surface, a plurality of crossbars extending between and secured to each pair of said pushbars at longitudinally spaced positions therealong for movement therewith and above said conveyor surface, a plurality of longitudinally spaced checker bars fixed to said surface with each checker bar located between a longitudinally adjacent pair of crossbars, each of said checker bars and crossbars having an upwardly and forwardly inclined rear surface and a forward surface for butting material to be conveyed, means for advancing said sections in a forward direction whereby the crossbars advance the material forwardly thereof along said surface and over the inclined surfaces of said checker bars and for retracting said sections whereby the crossbars move under the advanced material with such material being retained against substantial rearward movement by the forward surfaces of said checker bars, said advancing and retracting means including a yoke assembly for each said conveyor section including a cross member secured to said pushbars, a fixed support carried by said base, and fluid actuated means engaging between said fixed support and each said cross member for reciprocating said conveyor sections, said advancing and retracting means further including means for reciprocating said sections in an out-of-phase relation one with the other with one of said sections being moved forwardly to advance the material while the other section is moved rearwardly, and including a conveyor located along the discharge end of said conveyor sections for receiving material therefrom and discharging such material to one side thereof, a wear strip disposed in each said guideway, each said pushbar bearing on the wear strip in the corresponding guideway, and means for retaining said pushbar in said guideway and bearing on said wear strip.

* * * * *

UNITED STATES PATENT OFFICE
CERTIFICATE OF CORRECTION

Patent No. 3,923,149         Dated December 2, 1975

Inventor(s) George H. Stearns

It is certified that error appears in the above-identified patent and that said Letters Patent are hereby corrected as shown below:

Col. 3, line 33, "normall" should read --normal--.
Col. 4, line 36, "moves the" should read --moves over the--.
Col. 4, lines 38 and 39, "advanced is" should read --advanced material is--.
Col. 4, line 55, "conveyor" should read --conveyors--.
Claim 1, line 44, "between fixed" should read --between said fixed--.
Claim 7, line 54, "out-of phase" should read --out-of-phase--.

Signed and Sealed this twenty-ninth Day of June 1976

[SEAL]

Attest:

RUTH C. MASON
Attesting Officer

C. MARSHALL DANN
Commissioner of Patents and Trademarks